(12) United States Patent
Hermes et al.

(10) Patent No.: US 7,235,595 B2
(45) Date of Patent: Jun. 26, 2007

(54) AQUEOUS TRAFFIC PAINT AND METHOD OF APPLICATION

(75) Inventors: Ann R. Hermes, Ambler, PA (US); Mary Anne R. Matthews, Willow Grove, PA (US); Donald C. Schall, Lansdale, PA (US); Jeffrey J. Sobczak, Coatesville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 493 days.

(21) Appl. No.: 10/910,212

(22) Filed: Aug. 3, 2004

(65) Prior Publication Data

US 2005/0032933 A1   Feb. 10, 2005

Related U.S. Application Data

(60) Provisional application No. 60/492,459, filed on Aug. 4, 2003.

(51) Int. Cl.
*F21V 7/22* (2006.01)

(52) U.S. Cl. .................................. 523/172; 524/494
(58) Field of Classification Search ................ 523/172; 524/494

See application file for complete search history.

(56) References Cited

U.S. PATENT DOCUMENTS 5,306,743 A    4/1994   Klesse et al.

FOREIGN PATENT DOCUMENTS

EP    0 409 459 A    1/1991
JP    8 2831611 A    10/1996

*Primary Examiner*—Edward J. Cain
(74) *Attorney, Agent, or Firm*—Kim Jessum

(57) ABSTRACT

An aqueous traffic paint including hard-soft polymer particles, polyfunctional amine, and volatile base is provided. The hard-soft polymer particles, which contain soft polymer and hard polymer, have a hydrophobicity characterized by a Hansch parameter of at least 3. Also provided is a method of producing a traffic marking on a road surface using the aqueous paint. The aqueous traffic paint is suitable for application to road surfaces, including oily road surfaces, and may be applied at temperatures below 15° C.

14 Claims, No Drawings

AQUEOUS TRAFFIC PAINT AND METHOD OF APPLICATION

CROSS REFERENCE TO RELATED PATENT APPLICATIONS

This is a non-provisional application of prior pending U.S. provisional application Ser. No. 60/492,459 filed Aug. 04, 2003.

This invention generally relates to an aqueous traffic paint useful for producing traffic markings on road surfaces. The aqueous traffic paint includes polymer particles containing select ranges of soft polymer and hard polymer. Also provided is a method of applying the aqueous traffic paint to provide a traffic marking.

White and yellow traffic markings are commonly used for demarcating traffic lanes on roads. These markings ensure safe driving conditions under varying weather conditions. The term "roads" generally means routes, highways, exit and entry ramps, passes, pavements, side walks, and parking lots for vehicles, such as automobiles, trucks, and bicycles. The roads are usually paved with asphalt or concrete, generally from Portland cement. The majority of these traffic markings, such as solid, transverse, and interrupted stripes, are paint-based and include solvent compositions and aqueous compositions.

The application of traffic paints is inherently challenging because the road substrate to which the paint is applied is rarely of uniform consistency or "clean". Various foreign substances cover road surfaces either partially or completely. This is especially the case with respect to existing road surfaces which require periodic repainting of their traffic markings. Particularly problematic roads to paint are those where oil is present on the surface. This oil may result from deposits produced over a long period of time by oil or grease that is dropped from vehicles. Also, older vehicle engines may burn increasingly more oil as part of the internal combustion process. This oil is vaporized and passes out from the exhaust system. Once airborne, the vaporized oil may cool, condense and drop to the road surface to form an oily deposit. Another source of oily deposits is oil based materials that leach from the road bed to the surface of the road bed over time. A further source of oily deposits is asphalt or tar based products employed to patch holes or cracks in the road surface. Acceptable adhesion to oily road surfaces is a desired property in traffic paints.

At application of aqueous traffic paints is typically more difficult at temperatures below 15° C., especially obtaining good film formation of the aqueous traffic paint and adhesion of the traffic marking to the road surface. In northern climates and at high elevations, suitable temperatures for applying road markings are often obtained only during limited periods, such as the summer season. In these regions, this short application period is generally inadequate to complete the necessary road painting prior to colder weather. Aqueous traffic paints with improved application properties at lower temperatures would provide longer painting seasons for the application of road marking.

Further, traffic markings are exposed to dirt, dust, and soot, which may accumulate on the surface of the traffic marking, thus darkening the traffic marking. Darkened traffic markings have less visibility against the road surface, especially asphalt surfaces. Dirt pickup resistance, a generally recognized desirable characteristic of a coating, is the ability to minimize the accumulation of material such as dirt, dust, and soot onto the surface of the coating. Traffic markings require acceptable dirt pickup resistance to maintain their contrast with the road surface and thus continue to serve their purpose demarcating the road surface.

U.S. Pat. No. 6,228,901 discloses a method of producing wear resistant traffic markings on road surfaces and a traffic paint to produce these wear resistant traffic markings. The disclosed traffic paint contains a highly hydrophobic polymer, which is free from styrene. However, this reference does not address the issues of providing a traffic paint that may be successfully applied to an oily road surface, a traffic paint that may be applied at lower application temperatures, or a traffic marking having acceptable dirt pickup resistance.

Desired in the art is an aqueous traffic paint that may be applied at lower temperatures, that has acceptable adhesion to oily road surfaces as well as non-oily road surfaces, and that provides road marking with acceptable dirt pickup resistance.

The inventors have discovered an aqueous traffic paint suitable for application at lower temperatures. Further, the traffic paint has acceptable adhesion to oily road surfaces and to non-oily road surfaces. The traffic markings prepared from this aqueous traffic paint also have acceptable levels of dirt pickup resistance.

The first aspect of the present invention provides an aqueous traffic paint including: a) hard-soft polymer particles having pendant acid-functional groups; wherein each of the hard-soft polymer particles contain, based on weight of the hard-soft polymer particles: i) from 65 to 95 weight % of a soft polymer having a glass transition temperature in the range of from −40 to 20° C. and ii) from 5 to 35 weight % of a hard polymer having a glass transition temperature of at least 40° C., wherein the hard-soft polymer particles have a Hansch parameter of at least 3; b) polyfunctional amine; and c) an amount of volatile base sufficient to raise the pH of the aqueous traffic paint to a point where substantially all of the polyfunctional amine is in a non-ionic state.

The second aspect of the present invention provides an aqueous traffic paint including: a) hard-soft polymer particles comprising pendant acid-functional groups; wherein each of the hard-soft polymer particles contain, based on weight of the hard-soft polymer particles: i) from 50 to 65 weight % of a soft polymer having a glass transition temperature in the range of from −75 to −30° C., and ii) from 35 to 50 weight % of a hard polymer having a glass transition temperature of at least 30° C.; wherein the hard-soft polymer particles have a Hansch parameter of at least 3; b) polyfunctional amine; and c) an amount of volatile base sufficient to raise the pH of the aqueous traffic paint to a point where substantially all of the polyfunctional amine is in a non-ionic state.

The third aspect of the present invention provides a method of producing a traffic marking on a road surface including: a) applying onto the road surface a layer of an aqueous traffic paint including: i) hard-soft polymer particles having pendant acid-functional groups; wherein each of the hard-soft polymer particles contain, based on weight of the hard-soft polymer particles: from 65 to 95 weight % of a soft polymer having a glass transition temperature in the range of from −40 to 20° C. and from 5 to 35 weight % of a hard polymer having a glass transition temperature of at least 40° C., wherein the hard-soft polymer particles have a Hansch parameter of at least 3; ii) polyfunctional amine; and iii) an amount of volatile base sufficient to raise the pH of the aqueous traffic paint to a point where substantially all of the polyfunctional amine is in a non-ionic state; and b) evaporating the volatile base from the aqueous traffic paint to provide the traffic marking.

As used herein, the use of the term "(meth)" followed by another term such as acrylate refers to both acrylates and methacrylates. For example, the term "(meth)acrylate" refers to either acrylate or methacrylate; the term "(meth) acrylic" refers to either acrylic or methacrylic; the term "(meth)acrylonitrile" refers to either acrylonitrile or methacrylonitrile; and the term "(meth)acrylamide" refers to either acrylamide or methacrylamide.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated using the Fox equation.

The term "pendant" is used in the specification to mean "attached to the polymer backbone" The term "pendant" also includes attachment of such groups at the termini of a polymer chain.

The aqueous copolymer composition of the present invention includes hard-soft polymer particles dispersed in an aqueous medium. The hard-soft polymer particles are addition polymers prepared by the polymerization of ethylenically unsaturated monomer. Each of the hard-soft polymer particles contain soft polymer and hard polymer. The hard-soft polymer particles also contain pendant acid-functional groups. Examples of pendant acid-functional groups include carboxylic acid groups; phosphorus acid groups such as phosphoric acid groups; sulfur acid groups such as sulfuric acid groups; and salts thereof. The hard-soft polymer particles may contain more than one type of acid-functional group. The pendant acid-functional groups are included in the soft polymer, the hard polymer, or both the hard polymer and the soft polymer. The hard-soft polymer particles may contain the pendant acid-functional groups in their acid form or as a salt thereof. In the first aspect of the invention, the hard-soft polymer particles contain from 5 to 35 weight % of hard polymer, preferably from 10 to 35 weight % hard polymer, and more preferably from 20 to 35 weight % hard polymer, based on the weight of the hard-soft polymer particles. The hard polymer has a glass transition temperature of at least 40° C. Other suitable ranges for the glass transition temperature include at least 50° C. and at least 60° C. Other examples of suitable glass transition temperature ranges for the hard polymer include a range of from 40 to 110° C., preferably in the range of from 50 to 110° C., and more preferably in the range of from 60 to 110° C. The hard polymer is an addition polymer formed by the polymerization of one or more ethylenically unsaturated monomer.

In the first aspect of the invention, the hard-soft polymer particles contain from 65 to 95 weight % of soft polymer, preferably from 65 to 90 weight % soft polymer, and more preferably from 65 to 80 weight % soft polymer, based on the weight of the hard-soft polymer particles. The soft polymer has a glass transition temperature in the range of from −40 to 20° C., preferably in the range of from −15 to 15° C., and more preferably in the range of from −10 to 10° C. The soft polymer is an addition polymer formed by the polymerization of one or more ethylenically unsaturated monomers.

In the second aspect of the invention, the hard-soft polymer particles contain from 35 to 50 weight % of hard polymer and preferably from 35 to 45 weight % hard polymer, based on the weight of the hard-soft polymer particles. The hard polymer has a glass transition temperature of at least 30° C. Examples of suitable glass transition temperature include at least 45° C., and at least 55° C. Other examples of suitable glass transition temperature ranges for the hard polymer include a range of from 30 to 110° C., preferably in the range of from 45 to 110° C., and more preferably in the range of from 55 to 110° C. The hard polymer is an addition polymer formed by the polymerization of one or more ethylenically unsaturated monomer.

In the second aspect of the invention, the hard-soft polymer particles contain from 50 to 65 weight % of soft polymer and preferably from 55 to 65 weight % soft polymer, based on the weight of the hard-soft polymer particles. The soft polymer has a glass transition temperature in the range of from −75 to −30° C., preferably in the range of from −65 to −30° C., and more preferably in the range of from −60 to −30° C. The soft polymer is an addition polymer formed by the polymerization of one or more ethylenically unsaturated monomers.

The hard-soft polymer particles have a hydrophobicity defined by a Hansch π parameter of at least 3, preferably at least 3.2, and more preferably at least 3.5. Typically, the hard-soft polymer particles have a Hansch parameter of 6 or less. The Hansch π parameter for a polymer, also referred to herein as the "Hansch parameter", is calculated using a group contribution method. The monomer units forming a polymer are assigned a hydrophobicity contribution and the relative hydrophobicities of the polymer is calculated based on the weight average of the monomers in the polymer. Hansch and Fujita, *J. Amer. Chem. Soc.*, 86, 1616–1626 (1964); H. Kubinyi, *Methods and Principles of Medicinal Chemistry*, Volume 1, R. Mannhold et al., Eds., VCH, Weinheim (1993); C. Hansch and A. Leo, *Substituent Constants for Correlation Analysis in Chemistry and Biology*, Wiley, New York (1979); and C. Hansch, P. Maloney, T. Fujita, and R. Muir, *Nature*, 194. 178–180 (1962). Hansch π values for several ethylenically unsaturated monomers are listed in Table 1.

TABLE 1

| Monomer | Hansch π Value |
| --- | --- |
| ethyl acrylate | 2.11 |
| butyl acrylate | 3.19 |
| 2-ethyl hexylacrylate | 5.22 |
| styrene | 4.29 |
| methyl methacrylate | 1.89 |
| ethyl methacrylate | 2.43 |
| butyl methacrylate | 3.51 |
| isobornyl methacrylate | 2.22 |
| butadiene | 4.0 |
| acrylic acid | −2.52 |
| methacrylic acid | −2.2 |
| maleic anhydride | −3.5 |

An ethylenically unsaturated monomer having a Hansch π parameter of at least 3 or greater is referred to herein as a "hydrophobic monomer". In the hard-soft polymer particles, polymerized units of the hydrophobic monomer may be contained in the soft polymer, the hard polymer, or in both the hard and the soft polymers. Typically, the soft polymer typically contains as polymerized units, from 10 to 100 weight %, preferably 20 to 100 weight %, and more preferably from 30 to 100 weight % of one or more different hydrophobic monomers, based on the weight of the soft polymer.

The hard polymer and the soft polymer contain as polymerized units, nonionic monomers, or ionic monomers such as acid-functional monomers or base-functional monomers. Hydrophobic monomers are nonionic monomers that have a Hansch parameter of at least 3. Examples of nonionic monomers include $C_1$ to $C_{24}$ alkyl esters of (meth)acrylic acid such as methyl (meth)acrylate; ethyl acrylate; butyl (meth)acrylate, lauryl (meth)acrylate, and stearyl (meth)acrylate; hydroxyethyl (meth)acrylate; hydroxypropyl (meth)acrylate; alkenes such as ethylene; dienes such as butadiene; styrene, alpha-methyl styrene; ring substituted styrenes; and (meth)acrylonitrile. Other nonionic monomers include multiethylenically unsaturated monomers such as allyl (meth)acrylate, diallyl phthalate, 1,4-butylene glycol dimethacrylate, 1,6-hexanediol diacrylate, and divinyl benzene. Examples of base-functional monomers include (meth)acrylamide; substituted (meth)acrylamides such as (meth)acrylamides with alpha-alkyl or aryl groups, or N-alkyl or aryl groups. Additionally, polymerized units of acid-functional monomer are included in the hard polymer, the soft polymer, or both the hard polymer and the soft polymer to provide the hard-soft polymer particle with the pendant acid-functional groups. Examples of suitable acid-functional monomers include carboxylic acid monomers such as (meth)acrylic acid, itaconic acid, fumaric acid, crotonic acid, maleic acid, monomethyl itaconate, monomethyl fumarate, monobutyl fumarate, and maleic anhydride; sulfur containing acids such as 2-acrylamido-2-methyl-1-propanesulfonic acid and sodium vinyl sulfonate; and phosphorus containing acids such as 2-phosphoethyl (meth) acrylate. The acid-functional monomers may be used in their acid or salt forms. Suitable levels of polymerized acid-functional monomer in the hard-soft polymer particles include from 0.1 to 10 weight %, preferably from 0.3 to 6 weight %, and more preferably from 0.5 to 6 weight %, based on the weight of the hard-soft polymer particles. The hard polymer or the soft polymer optionally contain one or more multiethylenically unsaturated monomers as polymerized units. The level of the optional one or more multiethylenically unsaturated monomers contained as polymerized units in the hard-soft polymer particles is chosen such that the quality of film formation is not materially impaired.

Typically, the hard-soft polymer particles have average particle diameters in the range of from 50 nanometers (nm) to 1 micron, preferably in the range of from 100 to 350 nm, and more preferably in the range of 150 to 300 nm. Average particle diameter is measured by a quasielastic light scattering technique, such as provided, for example, by the 90Plus Particle Sizer of Brookhaven Instruments Corp. The hard-soft polymer particles contained in the aqueous paint composition may have an unimodal or a multimodal particle diameter distribution, including a bimodal particle size distribution.

The average molecular weight of the hard-soft polymer particles is typically 20,000 Daltons or greater, and preferably in the range of from 40,000 to 2,000,000 Daltons. The soft polymer and the hard polymer may have different weight average molecular weights. The weight average molecular weight of a polymer is commonly controlled by addition of multiethylenically unsaturated monomers or chain transfer agents to the polymerization mixture.

The hard-soft polymer particles may have various morphologies, such as, for example, core/shell particles, core/shell particles with shell phases incompletely encapsulating the core, core/shell particles with a multiplicity of cores, particles having multiple domains of one polymer in the other polymer, or interpenetrating network particles. Preferably, the hard polymer forms the core and the soft polymer forms the shell.

The polymerization techniques used for preparing the hard-soft polymer particles are well known in the art. The hard-soft polymer particles are typically prepared by a multistage aqueous emulsion polymerization process, in which at least two stages differing in composition are formed in a sequential fashion. Multistage polymerization techniques suitable for preparing the hard-soft polymer particles are disclosed, for examples, in U.S. Pat. Nos. 4,325,856, 4,654,397, and 4,814,373. In the multistage polymerization process to prepare the hard-soft polymer of the present invention, either the soft polymer or the hard polymer is prepared as a dispersion of first polymer particles in water, followed by the polymerization of the other polymer (the hard polymer or the soft polymer, respectively) in the presence of the first polymer particles to provide the hard-soft polymer particles.

The polymerization process may be initiated by either thermal or redox initiation processes, which include convention free radical initiators, such as, for example, hydrogen peroxide, benzoyl peroxide, t-butyl hydroperoxide, t-butyl peroctoate, ammonium and alkali persulfates, typically at a level of from 0.05% to 3.0% by weight, based on the weight of total monomer. Further, the preparation of the hard-soft polymer particles may include the addition of surfactant prior to, during, or after the polymerization of the soft polymer or the hard polymer. Suitable surfactants include anionic surfactants, nonionic surfactants, and combinations thereof. Typical anionic surfactants include the salts of fatty rosin and naphthenic acids, condensation products of naphthalene sulfonic acid and formaldehyde of low molecular weight, carboxylic acid polymers and copolymer of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic surfactants include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1 to 6 percent by weight based on the weight of polymerized monomers forming the hard-soft polymer particles.

The weight average molecular weight of the soft polymer or the hard polymer may be controlled by the addition of chain transfer agents such as, for example, $C_1$ to $C_{12}$ alkyl or functional alkyl mercaptans, alkyl or functional alkyl mercaptoalkanoates, or halogenated hydrocarbons, which may be employed at levels in the range of from 0.1% to 10% by weight, based on the weight of the soft polymer or the hard polymer.

The hard-soft polymer particles are typically provided as an aqueous dispersion. Typically, the aqueous traffic paint of this invention contains from 10 to 25 weight %, and preferably from 15 to 20 weight %, based on the weight of the aqueous traffic paint.

The aqueous traffic paint also includes polyfunctional amine as a component. The polyfunctional amine is a polymer containing from 20 to 100 weight % of amine-containing monomer as polymerized units. Examples of the amine containing monomers include aminoalkyl vinyl ether or sulfides; acrylamide or acrylic esters such as dimethylaminoethyl (meth)acrylate; N-acryloxyalkyl-oxazolidines such as poly(oxazolidinylethyl methacrylate) and N-acryloxyalkyltetrahydro-1,3-oxazines; and polymers of monomers that readily generate amines by hydrolysis, as disclosed in U.S. Pat. No. 5,804,627. Other suitable polyfunctional amines include poly(ethyleneimine), as disclosed in WO 96/33448 and poly(vinylamine) as disclosed in published U.S. patent application No. 20020168534. Typical levels of the polyfunctional amine in the aqueous traffic paint are in the range of from 0.05 to 20 weight %, preferably in the range of from 0.1 to 15 weight %, and more preferably in the range of from 0.5 to 10 weight %, based on the weight of hard-soft polymer particles contained in the aqueous traffic paint. One or more different polyfunctional amines may be used in the aqueous traffic paint The type and amount of volatile base used must be sufficient to raise the pH of the aqueous traffic paint to the point where substantially all of the polyfunctional amine is in a non-ionic state (deprotonated). In the aqueous traffic paint, typically, 20 to 100 mole % of the amino groups of the polyfunctional amine are deprotonated, preferably 60 to 100 mole %, more preferably 80 to 100 mole %, and most preferably 90 to 100 mole %. Suitable ranges for the pH of the aqueous traffic paint include a range of from 7.5 to 11, and preferably a range of from 9.5 to 10.7. Volatile bases useful in the composition of the present invention include, for example, ammonia, morpholine, the lower alkyl amines, 2-dimethylaminoethanol, N-methylmorpholine, and ethylenediamine. The volatile base of preference is ammonia, which may be used as the sole volatile base or in admixture with other volatile or nonvolatile bases.

The aqueous medium of the traffic paint includes water and optionally, one or more water miscible organic solvents, such as, methanol, ethanol, glycols, and glycol ethers.

The aqueous traffic paint of this invention optionally contains other components, such as, for example, thickeners; rheology modifiers; dyes; sequestering agents; biocides; dispersants; pigments such as titanium dioxide, organic pigments, and carbon black; extenders such as calcium carbonate, talc, clay, silica, and silicates; fillers such as glass microspheres or polymeric microspheres, quartz, and sand; anti-freeze agents; plasticizers; adhesion promoters such as silanes; coalescents; colorants; tackifiers; waxes; preservatives; freeze/thaw protectors; corrosion inhibitors; and anti-flocculants. During the application of the aqueous traffic paint to the surface of a substrate, glass or polymeric microspheres, quartz, or sand may be added as part of the aqueous traffic paint or as a separate component applied to the surface in a separate step simultaneously with, before, or after the step of application of the aqueous traffic paint.

The third aspect of the present invention provides a method of producing a traffic marking on a road surface. This method includes: applying onto the road surface a layer of the aqueous traffic paint of the first aspect of this invention or the second aspect of this invention; and evaporating the volatile base from the applied layer of the aqueous traffic paint to provide the traffic marking on the road surface. Optionally, the method also includes evaporating the aqueous medium from the applied layer of the aqueous traffic paint.

Various methods are know in the art to apply the layer of the traffic paint, such as, for example, by spraying the traffic paint on the road surface using truck mounted spray guns where the traffic paint is supplied from an air pressurized tank or an airless pump; and by applying the traffic paint by hand using a paint brush or a paint roller. It is contemplated that the road surface on which the layer of the traffic paint is applied is preferably cleaned by removing any dirt or sediments prior to the application of the traffic paint. The thickness of the layer of the traffic paint generally varies from 300 microns to 3000 microns, preferably from 350 micron to 1000 microns.

If desired, the method of the present invention optionally includes dropping glass beads on the layer of the traffic paint of the present invention before the layer is dry to ensure the adhesion of the glass beads to the layer applied to the road surface. Facially disposed glass beads on the traffic markings act as light reflectors. If glass beads are not used, the traffic markings would be difficult to see under night and wet weather conditions. Thus, almost all of the traffic markings are beaded, i.e., glass beads sprinkled and affixed on top of the coatings roughly at the rate of 0.72 to 2.9 kilograms or more per liter of paint for night and wet weather visibility. The glass beads are dropped by methods known in the art, such as, by spraying the glass beads entrained and conveyed by a jet of air and dropped atop the layer or by sprinkling the glass beads at a desired rate from a storage hopper positioned above the layer of the traffic paint of the present invention. The glass beads are applied over the layer, while the layer is still in its "wet state, i.e., before the layer dries up to form the traffic paint marking. The amount of glass beads dropped on the layer is dependent upon the size, refractive index, and surface treatment of the glass beads. Alternatively, the glass beads are premixed into the traffic paint prior to the application of the traffic paint onto the road surface. The typical glass beads specified for traffic markings are described under AASHTO Designation M 247–81 (1993) developed by American Association of State Highway and Transportation Officials, Washington, D.C.

During application of the aqueous traffic paint of the present invention to the surface of a substrate, "absorbers" may be added as a separate component applied to the surface in a separate step simultaneously with, before, or after the step of application of the aqueous coating composition. Used herein, the term "absorber" refers to the general class of material that includes hollow sphere polymer, ion exchange resin beads, absorbent inorganic compounds, such as talc and Sumica gel, molecular sieves, non-porous carbonaceous materials, porous carbonaceous materials, and superabsorbent polymer. These absorbers are capable of further increasing the drying rate of the aqueous traffic paint of the present invention.

In one embodiment, the traffic paint contains hard-soft polymer particles having pendant acetoacetoxy groups. The acetoacetoxy groups are included in the hard polymer, the soft polymer, or both the hard polymer and the soft polymer. Hard-soft polymer particles having pendant acetoacetoxy groups may be prepared by incorporating as polymerized units, one or more acetoacetoxy functional monomers. Acetoacetoxy functional monomers are monomers having an ethylenic unsaturation and one or more acetoacetyl moieties. These acetoacetyl functional monomers have the following structures:

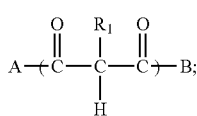

wherein A is either:

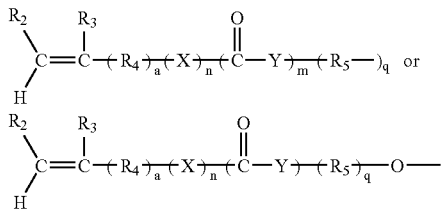

wherein $R_1$ is selected from H, alkyl having 1 to 10 carbon atoms, and phenyl; $R_2$ is selected from H, alkyl having 1 to 10 carbon atoms, phenyl, halo, $CO_2$ $CH_3$, and CN; wherein $R_3$ is selected from H, alkyl having 1 to 10 carbon atoms, phenyl, and halo; wherein $R_4$ is selected from alkylene having 1 to 10 carbon atoms and phenylene; wherein $R_6$ is selected from alkylene having 1 to 10 carbon atoms and phenylene; wherein a, m, n, and q are independently selected from 0 and 1; wherein each of X and Y is selected from —NH— and —O—; and B is selected from A, alkyl having 1 to 10 carbon atoms, phenyl, and heterocyclic groups. Preferably the acetoacetyl functional monomers include, among the following, various acetoacetamides, including, but not limited to:

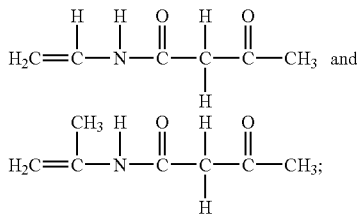

acetoacetoxyethyl methacrylate ("AAEM"); acetoacetoxyethyl acrylate ("AAEA"); allyl acetoacetate; vinyl acetoacetate; and combinations thereof.

AAEM is structurally represented as:

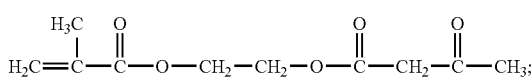

AAEA is structurally represented as:

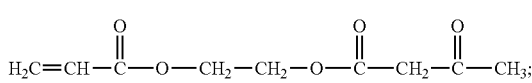

allyl acetoacetate is structurally represented as:

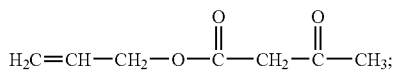

and vinyl acetoacetate is structurally represented as:

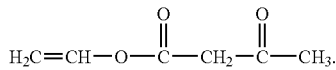

Particularly preferred acetoacetyl functional monomers include acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy) propyl methacrylate, and combinations thereof. In this embodiment, suitable levels of polymerized acetoacetoxy functional monomer include from 0.5 to 10 weight %, preferably from 1 to 9 weight %, and more preferably from 2 to 8 weight %, based on the weight of the hard-soft polymer particle.

In a different embodiment, the traffic paint of this invention also contains one or more silane functional compounds. The silane functional compound contains groups such as alkoxysilane groups, which hydrolyzed in the presence of water to form silanol groups. Silane functional compounds of various molecular weights and structures are suitable to modify the traffic paint of this embodiment and include silane functional compounds with the general structure:

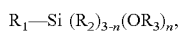

where n is an integer in the range of 1 to 3, $R_1$ is selected from alkyl, phenyl, and combinations thereof and optionally contains at least one functional group such as an amine group capable of forming an enamine with the pendant acetoacetyl pendant moiety, an epoxy group, an alkoxy silane group, or an isocyanate group; each $R_3$ is individually selected from alkyl, phenyl, and hydrogen atom; and each $R_2$ is selected from hydrogen atom, phenyl, and alkyl. The group $R_2$ is alternatively selected from oligomers of silane, which optionally contain $OR_3$ groups and also optionally include amine functionality. Practical considerations, such as, solubility, hydrolysis rate, compatibility with the hard-soft polymer particle, polymer stability, are some of the few limitations placed upon the structure and molecular weight of the aminosilane. Examples of suitable silane functional compounds include aminosilanes, isocyanate containing silanes, and epoxy silanes. Examples of suitable aminosilanes include N-methylaminopropyltrimethoxysilane, aminoethylaminopropyltrimethoxysilane, aminopropylmethyldimethoxysilane, aminopropyltrimethoxysilane, N-methylaminopropyltrimethoxysilane, polymeric aminoalkylsilicone, aminoethylaminoethylaminopropyl-trimethoxysilane, aminopropyltriethoxysilane, aminoethylaminopropylmethyldimethoxysilane, 4-aminobutyltriethoxysilane, aminopropylmethyldimethoxysilane, oligomeric aminoalkylsilane, and various combinations thereof.

In another embodiment, the traffic paint contains hard-soft polymer particles having pendant acetoacetoxy groups and aminosilanes. In this embodiment, suitable levels of aminosilane in the traffic paint include from 0.02 to less than 2 moles of amine moiety to one mole of acetoacetyl group, preferably from 0.02 to 1, more preferably from 0.05 to 0.5.

In a still further embodiment, the traffic paint contains a photosensitive composition. The photosensitive composition contains a groups capable of absorbing some portion of the solar light spectrum, such as ultraviolet or visible light. The photosensitive composition may be a photosensitive compound that is added to the traffic paint in the manner of an additive, or it may be a photosensitive groups chemically incorporated into one or more of the polymers of the hard-soft polymer particle, for example, by copolymerization. The photosensitive compounds may be used at a level of from 0.1 to 5 weight %, based on the weight of the hard-soft polymer particles. Suitable photosensitive compounds include benzophenone derivatives, wherein one or both of the phenyl rings may be substituted, such as, for example, benzophenone, 4-methyl benzophenone, 4-hydroxy benzophenone, 4-amino benzophenone, 4-chloro benzophenone, 4,4'-dimethyl benzophenone, 4,4'-dichlorobenzophenone, 4-carboxymethyl benzophenone, 3-nitrobenzophenone, substituted phenyl ketones such as substituted phenyl acetophenones. Preferred are benzophenone or a 4-substituted (para-) benzophenone. Most preferred is benzophenone. Photosensitive groups capable of being chemically incorporated may be present as copolymerized ethylenically unsaturated monomers, which may be used at levels in the range of from 0.1 to 5 weight %, based on the weight of the hard-soft polymer particles, are disclosed in U.S. Pat. Nos. 3,429,852; 3,574,617; and 4,148,987. Additionally, allyl benzoylbenzoates and copolymerizable monomers incorporating pendant benzophenone radicals may be used. Preferred are vinylbenzyl methylbenzoylbenzoate, hydroxymethacryloxypropyl methylbenzoylbenzoate, hydroxymethacryloxypropyl benzoylbenzoate, and hydroxymethacryloxypropoxy benzophenone.

The following examples are presented to illustrate the composition and the method of the invention. These examples are intended to aid those skilled in the art in understanding the present invention. The present invention is, however, in no way limited thereby.

The following abbreviations are used in the examples:

| | |
|---|---|
| Surfactant-A | ethoxylated $C_6$–$C_{18}$ alkyl ether sulfate having 1 to 40 EO groups per molecule (30 weight % active in water) |
| BA | butyl acrylate |
| EHA | 2-ethyl hexyl acrylate |
| MAA | methacrylic acid |
| MMA | methyl methacrylate |
| nDDM | n-dodecylmercaptan |
| p(OXEMA) | poly(oxazolidinothylmethacrylate) prepared according to the procedure in EP 0950763A1. (25.4% active). |
| ST | styrene |

EXAMPLE 1

Preparation of Aqueous Dispersions Containing Hard-soft Polymer Particles

Aqueous dispersions containing the hard-soft polymer particles were prepared in a 5-liter, four-necked round bottom flask equipped with a paddle stirrer, a thermometer, a nitrogen inlet, and a reflux condenser.

EXAMPLE 1.1

To the flask was added 700 g deionized water. The contents of the flask was heated to 88° C. under a nitrogen atmosphere. A monomer emulsion (ME-1) was prepared by mixing 560 g deionized water, 22.1 g Surfactant-A, 421.4 g EHA, 322.0 g BA, 428.4 g MMA, 210.0 g ST, 18.2 g MAA, and 14.0 g nDDM. A portion of ME-1 (64.2 g) was added to the flask followed by 20 g deionized water and a solution of 6.4 g of ammonium persulfate dissolved in 50 g deionized water. Next, a solution containing 6.4 g sodium carbonate dissolved in 50 g deionized water was added. The remainder of ME-1 was added over a period of 126 minutes with the concurrent addition of a solution of 4.2 g ammonium persulfate dissolved in 75 g deionized water, while maintaining the contents of the flask at a temperature of 85° C. A second monomer emulsion (ME-2) was prepared by mixing 240.0 g of deionized water, 9.4 g Surfactant-A, 108 g BA, and 492 g styrene. After the complete addition of ME-1 addition, ME-2 was added to the flask over a period of 54 minutes, while continuing the feed of ammonium persulfate solution and maintaining the contents of the flask at a temperature of 85° C. Deionized water rinses totaling 55 g were added upon the complete addition of ME-1 and ME-2. At the end of the polymerization, 0.01 g $FeSO_4$ dissolved in 9 g deionized water, 4.0 g t-butylhydroperoxide (70% active) in 24 g deionized water, and 2 g isoascorbic acid dissolved in 20 g deionized water were added to the flask. Next, ammonium hydroxide (28% active) was added to raise the pH to 9.8 followed by the addition of 140.7 g poly(OXEMA). The dispersion, Example 1.1, had a solids content of 50.7 weight % and contained hard-soft polymer particles having an average particle diameter of 186 nm. The hard-soft polymer particles contained 30 weight % hard polymer and 70 weight % soft polymer, based on the weight of the hard-soft polymer particles.

EXAMPLE 1.2

To the flask was added 790 g deionized water. The contents of the flask was heated to 88° C. under a nitrogen atmosphere. A monomer emulsion (ME-1) was prepared by mixing 640 g deionized water, 25.2 g Surfactant-A, 481.6 g EHA, 368.0 g BA, 489.6 g MMA, 240.0 g ST, 20.8 g MAA, and 16.0 g nDDM. A portion of ME-1 (64.2 g) was added to the flask followed by 20 g deionized water and 6.4 g of ammonium persulfate dissolved in 50 g deionized water. Next, a solution containing 6.4 g sodium carbonate dissolved in 50 g deionized water was added. The remainder of ME-1 was added over a period of 123 minutes with the concurrent addition of a solution of 4.2 g ammonium persulfate dissolved in 75 g deionized water, while maintaining the contents of the flask at a temperature of 85° C. A second monomer emulsion (ME-2) was prepared by mixing 160.0 g of deionized water, 6.3 g Surfactant-A, 72.0 g BA, and 328.0 g ST. After the complete addition of ME-1 addition, ME-2 was added to the flask at over a period of 27 minutes, while continuing the feed of ammonium persulfate solution and maintaining the contents of the flask at a temperature of 85° C. Deionized water rinses totaling 55 g were added upon the complete addition of ME-1 and ME-2. At the end of the polymerization, 0.01 g $FeSO_4$ dissolved in 9 g deionized water, 4.0 g t-butylhydroperoxide (70% active) in 24 g deionized water, and 2 g isoascorbic acid dissolved in 20 g deionized water were added to the flask. Next, ammonium hydroxide (28% active) was added to raise the pH to 10.6. The dispersion, Example 1.2, had a solids content of 50.5 weight % and contained hard-soft polymer particles having an average particle diameter of 205 nm. The hard-soft polymer particles contained 20 weight % hard polymer and 80 weight % soft polymer, based on the weight of the hard-soft polymer particles.

Comparative A

To the flask was added 900 g deionized water. The contents of the flask was heated to 90° C. under a nitrogen atmosphere. A monomer emulsion (ME), was prepared by mixing 625 g deionized water, 33.5 g Surfactant-A, 1000 g BA, 966.0 g ST, and 34 g AA. A solution of 5.2 g of ammonium persulfate dissolved in 50 g deionized water and a solution containing 6.3 g ammonium carbonate dissolved in 50 g deionized water (deionized water) were added to the flask followed by the addition of 131 g of a polymer seed latex (41.5 weight % solids, average particle diameter of 60 nm) and a rinse of 20 g deionized water. The ME was added to the flask over a period of 187 minutes with the concurrent addition of a solution of 7.8 g ammonium persulfate dissolved in 92 g deionized water, while maintaining the contents of the flask at a temperature of 85° C. At the end of the polymerization, 0.01 g $FeSO_4$ dissolved in 9 g deionized water, 0.01 tetrasodium salt of ethylenediaminetetraacetic acid in 1 g of deionized water, 4.0 g t-butylhydroperoxide (70% active) in 20 g deionized water, and 2 g isoascorbic acid dissolved in 20 g deionized water were added to the flask. Next, ammonium hydroxide (28% active) was added to raise the pH to 9.9. Benzophenone was added at a level of 1 weight %, based on polymer solids. The resulting dispersion, Comparative A, had a solids content of 51.0 weight % and contained polymer particles having an average diameter of 209 nm.

Comparative B

To the flask was added 756 g deionized water. The contents of the flask was heated to 88° C. under a nitrogen atmosphere. A monomer emulsion (ME), was prepared by mixing 750 g deionized water, 31.5 g Surfactant-A, 700 g EHA, 460 g BA, 814 g MMA, 26 g MAA, and 20 g nDDM. A solution of 6.4 g of ammonium persulfate dissolved in 50 g deionized water and a solution containing 6.4 g ammonium carbonate dissolved in 50 g deionized water (deionized water) were added to the flask followed by the addition of 160 g of a polymer seed latex (41.5 weight % solids, average particle diameter of 60 nm) and a rinse of 20 g deionized water. The ME was added to the flask over a period of 90 minutes with the concurrent addition of a solution of 4.2 g ammonium persulfate dissolved in 50 g deionized water, while maintaining the contents of the flask at a temperature of 85° C. At the end of the polymerization, 0.01 g $FeSO_4$ dissolved in 9 g deionized water, 1.8 g t-butylhydroperoxide (70% active) in 20 g deionized water, and 0.6 g isoascorbic acid dissolved in 20 g deionized water were added to the flask. Next, ammonium hydroxide (28% active) was added to raise the pH to 10.1. The resulting dispersion, Comparative B, had a solids content of 51.9 weight % and contained polymer particles having an average diameter of 196 nm.

Comparative C

To the flask was added 790 g deionized water. The contents of the flask was heated to 88° C. under a nitrogen atmosphere. A monomer emulsion (ME-1) was prepared by mixing 480 g deionized water, 18.9 g Surfactant-A, 361.2 g EHA, 276.0 g BA, 367.2 g MMA, 180.0 g ST, 15.6 g MAA, and 12.0 g nDDM. A portion of ME-1 (64.2 g) was added to the flask followed by 20 g deionized water and 6.4 g of ammonium persulfate dissolved in 50 g deionized water. Next, a solution containing 6.4 g sodium carbonate dissolved in 50 g deionized water was added. The remainder of ME-1 was added over a period of 108 minutes with the concurrent addition of a solution of 4.2 g ammonium persulfate dissolved in 75 g deionized water, while maintaining the contents of the flask at a temperature of 85° C. A second monomer emulsion (ME-2) was prepared by mixing 320.0 g of deionized water, 12.6 g Surfactant-A, 144 g BA, and 656.0 g ST. After the complete addition of ME-1 addition, ME-2 was added to the flask at over a period of 72 minutes, while continuing the feed of ammonium persulfate solution and maintaining the contents of the flask at a temperature of 85° C. Deionized water rinses totaling 55 g were added upon the complete addition of ME-1 and ME-2. At the end of the polymerization, 0.01 g $FeSO_4$ dissolved in 9 g deionized water, 4.0 g t-butylhydroperoxide (70% active) in 24 g deionized water, and 2 g isoascorbic acid dissolved in 20 g deionized water were added to the flask. Next, ammonium hydroxide (28% active) was added to raise the pH to 9.5. The dispersion, Comparative C, had a solids content of 50.6 weight % and contained comparative hard-soft polymer particles having an average particle diameter of 181 nm. The comparative hard-soft polymer particles contained 40 weight % hard polymer and 60 weight % soft polymer, based on the weight of the comparative hard-soft polymer particles.

Comparative D

Comparative D was Fastrack™ 3427 latex (latex or formulated traffic paint), (Rohm and Haas Company, Philadelphia, Pa.), supplied at 50 weight % solids, a pH of 10, and contained comparative polymer particles with an average particle diameter of 200 nm.

TABLE 1.1

Glass Transition Temperatures and Hansch Parameter for Examples 1.1–1.2 and Comparatives A to D

| | Soft Polymer Tg (° C.) | Hard Polymer Tg (° C.) | Average Tg (° C.) | Hansch Parameter |
|---|---|---|---|---|
| Example 1.1 | −16 | 58 | 2.4 | 3.68 |
| Example 1.2 | −16 | 58 | −4 | 3.62 |
| Comparative A | — | — | 3 | 3.62 |
| Comparative B | — | — | −24 | 3.30 |
| Comparative C | −16 | 58 | 9.4 | 3.73 |
| Comparative D | — | — | 18.5 | 2.37 |

EXAMPLE 2

Preparation of Aqueous Traffic Paints and Comparative Traffic Paints

Preparation of Traffic Paints

Aqueous traffic paints TP-1 and TP-2 and comparative traffic paints CTP-A to D were prepared by admixing the ingredients in the order listed in Table 2.1. The ingredients of Part I (A through I) were added sequentially under high shear agitation and then mixed for 15 minutes. Part II ingredients (J through N) were then added sequentially at an agitation speed necessary to maintain a deep vortex. Once all the ingredients were added, the formulation was mixed for 15 minutes. The viscosities of the aqueous traffic paints and the comparative traffic paints were in the range of 80 to 85 KU (Krebs Units).

TABLE 2.1a

Ingredients to Prepare Aqueous Traffic Paints and Comparative Traffic Paints in Part I (weights in grams)

| | A | B | C | D | E | F | G | H | I |
|---|---|---|---|---|---|---|---|---|---|
| TP-1 | 422.9 g Ex. 1.1 | — | 13.9 | — | 6.1 | 2.8 | 5.5 | 100 | 757.4 |
| TP-2 | 425.6 g Ex. 1.2 | — | 13.9 | — | 6.1 | 2.8 | 5.5 | 100 | 757.4 |
| CTP-A | 423.0 g Comp. A | 9.0 | 14.0 | — | 6.1 | 2.8 | 5.5 | 100 | 757.4 |
| CTP-B | 423.2 g Comp. B | — | 10.1 | 7.3 | — | 2.8 | 5.5 | 100 | 770.9 |
| CTP-C | 423.3 g Comp. C | — | 13.9 | — | 6.1 | 2.8 | 5.5 | 100 | 757.4 |
| CTP-D | 455.5 g Comp. D | — | — | 5.0 | — | 2.8 | 5.5 | 100 | 760.6 |

TABLE 2.1b

Ingredients to Prepare Aqueous Traffic Paints and Comparative Traffic Paints in Part II (weights in grams)

| | J | K | L | M | N |
|---|---|---|---|---|---|
| TP-1 | 30.0 | 32.8 | — | — | 20.8 |
| TP-2 | 30.0 | 21.9 | — | — | 30.4 |
| CTP-A | 30.0 | 21.9 | — | — | 22.3 |
| CTP-B | 30.0 | 13.5 | 2.3 | — | 32.3 |
| CTP-C | 30.0 | 32.7 | — | — | 20.7 |
| CTP-D | 30.0 | 23.0 | — | 6.8 | 18.0 |

Unless stated otherwise, the following ingredients were used in the formulation of the paints identified hereinabove. All weights are shown in grams.
A: aqueous dispersions of Example 1 (Ex. = Example; Comp. = Comparative).
B: water.
C: p(OXEMA), defined hereinabove.
D: Tamol ™ 901 dispersant, supplied by the Rohm and Haas Co., Philadelphia, PA.
E: Colloid ™ 226/35 dispersant, supplied by Rhodia, Inc., Cranbury, N.J.
F: Surfonyl ™ CT-136 surfactant, supplied by Air Products, Inc., Allentown, PA.
G: Drewplus ™ L-493 defoamer, supplied by Drew Chemical Co., Boonton, N.J.
H: TiPure ™ R-900 titanium dioxide supplied by E.I. duPont de Nemours & Co., Wilmington, DE.
I: Omyacarb ™ 5 calcium carbonate, supplied by Omya, Inc., Proctor, VT.
J: methanol.
K: Texanol ™ coalescent, supplied by Eastman Chemicals, Kingsport, TN.
L: benzophenone (30% in methanol).
M: Natrasol ™ 250 HR thickener, supplied by Hercules, Inc., Wilmington, DE (2 wt. % in water).
N: water

EXAMPLE 3

Evaluation of Aqueous Traffic Paints and Comparative Traffic Paints

The road marking test lines were produced in accordance with ASTM D 713–90. The glass beads used on these road markings were in conformance to AASHTO Designation M 247–81 (1993) published by the American Association of State Highway and Transportation Officials, Washington, D.C.

The traffic markings were applied under cold conditions: air temperature was 11 to 12° C. and road surface temperature was 13 to 14° C. Traffic markings were prepared by spray applying 380 micron thick layers of the aqueous traffic paint compositions transversely to the direction of traffic flow, i.e., perpendicular to the flow of traffic, over a concrete road surface by means of a walk behind, self-propelled striping machine, supplied by Linear Dynamics, Inc, Parsippany, N.J. The reason for applying the test lines in a direction transverse to traffic flow was to accelerate the degradation of test lines by increasing the number of vehicle passes over the test tracks, particularly where the vehicle tires pass most frequently, which was defined as the "wheel track area". Glass beads, sold under the name Highway Safety Spheres with Adherence Coating AC-110 supplied by Potters Industries, Inc., Carlstadt, N.J., were dropped on the layer of the white traffic paint composition.

The following tests were performed to evaluate the adhesion of the traffic markings to oily and non-oily road surfaces when applied at low temperatures, and to evaluate the dirt pickup resistance of the traffic markings.

Non-oily Wheel Track Adhesion

The road marking was applied by spraying it as a line positioned transverse to the direction of traffic flow as described hereinabove. The test lane was then opened up to traffic approximately 1 hour after application of the aqueous traffic paint. The traffic markings were evaluated for adhesion loss 8 months after application by being rated on a scale of from 0 to 10, with 10 representing no loss of adhesion, 0 representing total loss of adhesion, and the values in between used to indicate area varying degrees of adhesion loss. An acceptable level of non-oily wheel track adhesion was indicated by a value of at least 6.

Oily Surface Wheel Track Adhesion

Using a standard commercial grade automotive motor oil, a 15.2 cm×30.5 cm (6 inch×12 inch) oil patch was brushed onto the surface of a test section of a concrete based road surface. After waiting for approximately 1 hour, the aqueous traffic paint was applied by spraying it as a line positioned transverse to the direction of traffic flow. The test lane was then opened up for traffic approximately 1 hour after paint application. The traffic markings were evaluated for adhesion loss 2 weeks after application by being rated on a scale of from 0 to 10, with 10 representing no loss of adhesion, 0 representing total loss of adhesion, and the values in between used to indicate varying degrees of adhesion loss. An acceptable level of oily surface wheel track adhesion was indicated by a value of at least 6.

Crack Seal Adhesion

The test lines were applied over a 10 to 15.2 cm (4 to 6 inches) section of crack sealer in between the two lanes that covers the seams between the concrete sections of these lanes. The test lane was then opened up for traffic approximately 1 hour after paint application. The traffic markings were evaluated for adhesion loss 8 months after application by being rated on a scale of from 0 to 10, with 10 representing no loss of adhesion, 0 representing total loss of adhesion and the values in between used to indicate varying degrees of adhesion loss. An acceptable level of crack seal adhesion adhesion was indicated by a value of at least 6.

Dirt Pickup Resistance

The aqueous traffic paint was drawndown on a clean 10 cm×30.5 cm (4 inch×12 inch) glass panel at a wet film thickness of 325 microns, and allowed to dry for 48 hours at 22° C. and 50% relative humidity to provide a dried white paint film. After drying for 48 hours, a brown iron oxide slurry, prepared by mixing 100 grams of water and 100 grams of Mapico™ 422 brown iron oxide (Mapico Pigments, Beltsville, Md.) with 1 drop of Tamol™ 901 dispersant, was brushed onto the dried white paint film, and allowed to dry for 24 hours. After 24 hours, the iron oxide coated paint film was placed underneath running water, and rubbed with a wet paper towel until there was no further removal of the brown oxide slurry. The iron oxide coated paint film was dried for 24 hours. The color change due to permanent retention of the brown iron oxide slurry was measured using a calorimeter. The L* value, as measured according to the Hunter CIE L*a*b* color scale (L* scale: 0 (black) to 100 (white)), was measured for the washed iron oxide coated paint film. The initial L* value of the white paint film was 96. A L* value of 70 and above for the iron oxide treated paint film indicated an acceptable level of dirt pickup resistance.

TABLE 3.1

Evaluation of Road Markings Prepared from Examples 1.1–1.2 and Comparatives A to D

| | Low Temperature Road Test | | | DPUR |
|---|---|---|---|---|
| | Non-oily wheel track (8 months) | Oily wheel track (2 weeks) | Crack seal skip line (8 months) | Whiteness (L* value) |
| TP-1 | 6 | 8 | 7 | 86 |
| TP-2 | 7 | 9 | 7 | 70 |
| CTP-A | 7 | 4 | 1 | 70 |
| CTP-B | 8 | 8 | 9 | 49 |
| CTP-C | 3 | 2 | 6 | 93 |
| CTP-D | 6 | 3 | 1 | 70 |

The results in Table 3.1 show that the traffic paints of this invention, as exemplified by Examples 1.1 and 1.2, provided traffic markings with acceptable adhesion properties when applied at temperatures below 15° C. and onto oily road surfaces. Further, these traffic marking had acceptable dirt pickup resistance. In contrast, the comparative traffic paints did not provide this combination of adhesion and dirt pickup resistance properties, when applied at temperatures below 15° C. In particular, traffic markings prepared from comparative traffic paint CTP-A, which contained single stage polymer particles having a Hansch parameter of at least 3, had unacceptable adhesion to oily road surfaces. Comparative traffic paint CTP-B, which also contained single stage polymer particles having a Hansch parameter of at least 3 but having a lower glass transition value than CTP-A, provided traffic marking having acceptable adhesion to both non-oily and oily road surfaces, but unacceptable dirt pickup resistance. Further, traffic markings prepared from comparative traffic paint D, which contained single stage polymer particles having a Hansch parameter of less than 3, had unacceptable adhesion to oily road surfaces. Finally, traffic markings prepared from comparative traffic paint C, which contained comparative hard-soft polymer particles having 40 weight % hard polymer and 60 weight % soft polymer, has unacceptable adhesion to non-oily road surfaces and to some oily road surfaces.

In summary, the above results show that the aqueous traffic paint of the present invention, when applied at temperatures below 15° C., provide traffic markings with a combination of acceptable adhesion to non-oily road surfaces, acceptable adhesion to oily road surfaces, and acceptable resistance to the pickup of dirt.

What is claimed is:

1. An aqueous traffic paint comprising:
   a) hard-soft polymer particles comprising pendant acid-functional groups;
   wherein each of said hard-soft polymer particles comprise, based on weight of said hard-soft polymer particles:
      i) from 65 to 95 weight % of a soft polymer having a glass transition temperature in the range of from −40 to 20° C., and
      ii) from 5 to 35 weight % of a hard polymer having a glass transition temperature of at least 40° C.;
   wherein said hard-soft polymer particles have a Hansch parameter of at least 3;
   b) polyfunctional amine; and
   c) an amount of volatile base sufficient to raise the pH of said aqueous traffic paint to a point where substantially all of the polyfunctional amine is in a non-ionic state.

2. An aqueous traffic paint comprising:
   a) hard-soft polymer particles comprising pendant acid-functional groups;
   wherein each of said hard-soft polymer particles comprise, based on weight of said hard-soft polymer particles:
      i) from 50 to 65 weight % of a soft polymer having a glass transition temperature in the range of from −75 to −30° C., and
      ii) from 35 to 50 weight % of a hard polymer having a glass transition temperature of at least 30° C.;
   wherein said hard-soft polymer particles have a Hansch parameter of at least 3;
   b) polyfunctional amine; and
   c) an amount of volatile base sufficient to raise the pH of said aqueous traffic paint to a point where substantially all of the polyfunctional amine is in a non-ionic state.

3. The aqueous traffic paint according to claim 1 further comprising a silane functional compound.

4. The aqueous traffic paint according to claim 1 further comprising a photosensitive composition.

5. The aqueous traffic paint according to claim 1 further comprising a photosensitive composition and a silane functional compound.

6. The aqueous traffic paint according to claim 1 wherein said polyfunctional amine comprises as a polymerized unit a monomer selected from the group consisting of vinylamine, oxazolidinylethyl acrylate, oxazolidinylethyl methacrylate, dimethylaminoethyl acrylate, dimethylaminoethyl methacrylate, and ethyleneimine.

7. A method of producing a traffic marking on a road surface comprising the steps of:
   a) applying onto said road surface a layer of an aqueous traffic paint comprising:
      i) hard-soft polymer particles comprising pendant acid-functional groups;
      wherein each of said hard-soft polymer particles comprise, based on weight of said hard-soft polymer particles:
         from 65 to 95 weight % of a soft polymer having a glass transition temperature in the range of from −40 to 20° C., and
         from 5 to 35 weight % of a hard polymer having a glass transition temperature of at least 40° C.;
      wherein said hard-soft polymer particles have a Hansch parameter of at least 3;
      ii) polyfunctional amine; and
      iii) an amount of volatile base sufficient to raise the pH of said aqueous traffic paint to a point where substantially all of the polyfunctional amine is in a non-ionic state; and
   b) evaporating said volatile base from said aqueous traffic paint to provide said traffic marking.

8. The method according to claim 7 further comprising the step of dropping glass beads onto said layer of said aqueous traffic paint.

9. The method according to claim 7 further comprising the step of contacting said layer of said aqueous traffic paint with an absorber.

10. A traffic marking prepared in accordance to the method of claim 7.

11. The aqueous traffic paint according to claim 2 further comprising a silane functional compound.

12. The aqueous traffic paint according to claim 2 further comprising a photosensitive composition.

13. The aqueous traffic paint according to claim 2 further comprising a photosensitive composition and a silane functional compound.

14. The aqueous traffic paint according to claim 2 wherein said polyfunctional amine comprises as a polymerized unit a monomer selected from the group consisting of vinylamine, oxazolidinylethyl acrylate, oxazolidinylethyl methacrylate, dimethylaminoethyl acrylate, dimethylaminoethyl methacrylate, and ethyleneimine.

* * * * *